2,865,975
Patented Dec. 23, 1958

2,865,975

BATTERY ELECTRODES AND METHODS OF MAKING THE SAME

George S. Hartman, Roslyn, and Abraham L. Levine, Levittown, Pa., assignors to The Electric Storage Battery Company, a corporation of New Jersey No Drawing. Application June 24, 1953
Serial No. 363,912

5 Claims. (Cl. 136—28)

This invention relates to new articles of manufacture and fabricated shapes suitable for use as battery electrodes and has for an object the provision of an electrically conductive porous matrix whose interstitial surfaces include a minimum of oxidizable material.

In the manufacture of batteries utilizing impregnated plates, graphite has been used because of its high resistance to oxidation. It has been found, however, that even with the preferred graphitizing processes the conversion of carbon to graphite is not one hundred percent but on the contrary, the crystalline structure will vary from that characterizing pure carbon to that of pure graphite. There may also be present impurities which are themselves susceptible to oxidation. The importance of having a matrix not susceptible to oxidation lies in the fact that the efficiency of use of the active material to substantial degree depends upon the maintenance of contact between the active material in the multiplicity of pores and the walls thereof.

Where the active material, such as nickel hydroxide, has been deposited within the pores, there is initially relatively good contact between the deposited or precipitated material and the pore walls. In our concurrently filed application, Serial No. 363,911, filed June 24, 1953, we have described the process for a new article of manufacture in which the pores of a matrix have deposited therein a thin gas-permeable layer of metal used to increase the efficiency of contact between the active material and the pore walls.

The present invention is applicable not only to the invention described in the said application but also to graphite matrices and to other electrically conductive porous matrices in which there is present within the matrix oxidizable material.

In carrying out the invention in one form thereof, we remove from the interstitial surfaces substantially all of the oxidizable material, thus minimizing to a negligible degree the loss of wall structure due to oxidation during life of the electrode. The loss of wall structure arises by the conversion of the surface material to gas as, for example, the conversion of carbon to carbon monoxide or to carbon dioxide.

In accordance with the present invention, it has been found that the oxidizable material may be removed by immersing the plates in an oxygen-releasing electrolyte such as sodium or potassium hydroxide, other alkali-hydroxides obviously being suitable. With the porous matrix the anode, there is released by anodic electrolysis active and nascent oxygen throughout the porous structure, thus producing oxidation of all oxidizable material throughout the pore structure, the effect of which is to extend the porosity and to convert the oxidizable surface to one which is substantially inert to subsequent oxidation. Subsequent recession or loss of pore-walls is prevented.

In referring to surfaces as substantially inert to oxidation, what is meant is an inertness or resistance to oxidation of the order of pure graphite not contaminated by the presence of carbon or oxidizable impurities.

The electrolysis may be carried on with current densities of any convenient value, fifteen amperes per square foot being an exemplary value. All readily oxidizable materials present in the interstitial surfaces will be removed if the electrolysis be continued over a period of time of about three to five days. From this specification of the time required, it will be understood that a graphite matrix offers substantial resistance to oxidization but that under severe oxidizing conditions there will be loss of oxidizable material. It will be further understood that the time required for the treatment will depend upon the amount of nascent oxygen released per unit time, the higher the rate of oxygen released the shorter the time required for adequate treatment. In general, it will be found that even with relatively high rates of release of oxygen a minimum treatment of about forty-eight hours is indicated. While the oxidation of the matrix requires a considerable length of time, the operations are relatively simple and easily accomplished, whereas the impregnating steps are much more difficult and require greater personnel to carry them out. However, time spent in oxidizing is saved in the time required for impregnation, with the remaining advantage that the battery performance is improved both initially and during its life.

While it is within the scope of the invention chemically to release active or nascent oxygen throughout the porous structure, its production by electrolysis has been found to be convenient and practical.

The result of preoxidizing the matrix may not only be expected to extend battery life, but it is also highly effective in shortening the time required to fill the pores of the matrix with the desired amounts of active material. Where porous graphite plates have not been oxidized, there have been required five or six impregnations to fill the void volume up to an optimum value of about 35% whereas with the preoxidized matrices the optimum value of 35% void volume is attained by three and not more than four impregnations. The resultant saving in processing cost is considerable as will be understood when it is realized that an impregnating step requires the application of vacuum thoroughly to fill the pores with the impregnating solution, the application of the precipitant, the subsequent washing for a period of time which varies from as much as six hours to forty-eight hours, followed by drying.

As already mentioned, the present invention is applicable to porous structure of the type disclosed in our said concurrently filed application. It is understood that the oxidizable materials will first be removed from the porous structure as described above. After washing and drying the porous plates or matrices will then be impregnated with a plating solution. They are then immersed in a plating bath, and by controlled electrolysis there is electrically deposited throughout the pores and over the interstitial surfaces a thin layer of metal. For a battery in which the active material is nickel hydrate, a nickel electrode may be used for the plating. However, it is within the scope of the invention to use the thin metallic coating of metals differing from the used in the active material. Thus, for example, where the active material is nickel hydrate, the electrolytically deposited coating may be cadmium, silver or zinc, and there will then be used other electrodes of such materials which are inert to the battery electrolyte and to the active material and which have similar capabilities of being electrolytically deposited in a thin layer. Similarly, other active materials may be used with any one of the metals, providing the thin metallic coating is inert to the active material.

To introduce into the electrode the desired amount of active material, more than one impregnating step is needed. After thorough washing of the plate to remove the precipitating material, it is again impregnated with nickel nitrate and the precipitating agent again applied. It is believed there then arises a preferential growth of additional crystals either enlarging or attaching themselves to the crystals of nickel hydrate resulting from the first impregnating step.

By first coating the surfaces of the pores with a thin pervious metallic layer, it is believed there is provided a metallic surface with respect to which crystal growth will begin without preferential growth of crystals resulting from the first impregnating step. The result is that a greater proportion of the active material will be in good electrical and chemical contact with the metallic surface coating, and thus with the increased area of contact, there will be a greater efficiency of use of the active material.

It has been found that the thickness of the metallic coating and its character is fairly critical. It is necessary that the metallic coating be pervious to gas and impervious to liquid. This condition is met if the coating or layer of metal be mono-molecular. It should be quite thin, of the order of 0.001" or less. Where pores of exceedingly small size extend throughout the battery electrode, for example, pores ranging below five microns, the metal coating will be nearer the mono-molecular thickness than the 0.001" which has in some cases proven satisfactory.

While the range of thickness of the thin metal layer has been given as from mono-molecular to about 0.001", and while reference has been made to the fact that the layer may be pervious to gas but impervious to liquid, it is to be understood that as the thickness decreases, the thin layer will be pervious to some liquids. Even though pervious to battery electrolyte, the rate of oxidation of graphite or carbon or of the porous plate material is so much decresed, the conductivity and efficiency of impregnation so greatly increased, that the advantages of the present invention are to large degree realized. The metal thickness, while it may somewhat exceed about 0.001", may not exceed it in such degree that the layer will be impervious to gas since there will be in the plates sealed pores in which gas pressures could rise to destructive values.

Further in accordance with the invention, a battery plate or electrode made pursuant to the method thus far described may in its preferred form be provided with an electrical conductor corresponding with the lugs of battery plates in the following manner.

The plate itself is masked with material impervious and inert with respect to a plating bath except for a selected area at which the electrical conductor is to be secured. Though not essential, it is preferred that the exposed area shall be along not more than the face and/or an edge of the plate and shall not extend, for example, from one face of the plate, over the edge and downwardly along the opposite face of the plate. With the plate masked as described, it is then placed in a plating bath and electrolyzing current flows between a nickel anode and the plate for deposition of metallic nickel over the surface of the unmasked area. The current densities are not of great importance in the operation. Densities of from 0.002 of an ampere to 2.0 amperes per square inch have been successfully used, the plating operation being continued until there has been deposited an impervious coating having a thickness of about 0.002" or more. The plate is then removed from the bath, thoroughly washed and dried, after which the desired electrical conductor is secured thereto. By providing the desired area with a coating of non-porous or impervious metal, the electrical conductor may be joined thereto in the same maner as generally utilized for uniting metallic conductors as, for example, by soldering, brazing or welding.

In a further preferred form of the invention, the porous plates may be provided with recesses of shape complementary to those of the electrical conductors to be used. The surfaces of such recesses are then coated with the non-porous impervious layer of metal, after which the electrical conductor is placed therein and bonded to the coating. This form of the invention is preferred since the electrical conductors then occupy a space between the opposite surfaces of the plate, thus taking up a minimum amount of space and providing for assembly of the plates with minimum spacing therebetween. In accordance with the present feature of the invention there is avoided high-contact resistance between the battery lugs and the plates; there is avoided the possibility of electrolytic oxidation at the critical area in which current leaves or enters the plates.

While preferred forms of the invention have been disclosed, it is to be understood modifications may be made and features added or omission of certain features, all within the scope of the appended claims.

What is claimed is:

1. For a battery electrode, an electrically conductive porous graphite matrix characterized by interstitial surfaces treated with nascent oxygen over a period adequate to free said surfaces of all readily oxidizable material and electrolytically active material in the pores thereof.

2. A battery electrode, comprising an electrically conductive porous graphite matrix characterized by interstitial surfaces treated with nascent oxygen over a period adequate to free said surfaces of all readily oxidizable material, and active material deposited within the pores of the matrix.

3. A battery electrode comprising, a porous graphite matrix characterized by interstitial surfaces treated with nascent oxygen over a period adequate to free said surfaces of all readily oxidizable material, and the pores of which are impregnated with nickel hydrate.

4. The method of preventing loss of wall structure in an electrically conductive porous graphite matrix of a battery electrode, which comprises the step of releasing, in an electrolytic bath, nascent oxygen within the pores of said matrix to remove from said wall structure all readily oxidizable material prior to deposition therein of active material and impregnating said matrix with electrolytically active material.

5. In the method of impregnating an electrically conductive porous matrix with active material to form a battery electrode, the preparatory steps which comprise immersing said matrix in an electrolytic bath consisting of alkali-hydroxides, passing current through said matrix and said bath for release of nascent oxygen throughout the pores of said matrix, and after oxidation of all readily oxidizable material from the pore surfaces removing the alkali-hydroxides from the matrix preparatory to the impregnation thereof with active battery material.

References Cited in the file of this patent

UNITED STATES PATENTS

| | | |
|---|---|---|
| 572,472 | Castner | Dec. 1, 1896 |
| 884,930 | Jungner | Apr. 14, 1908 |
| 1,243,111 | Sanders | Oct. 16, 1917 |
| 1,314,632 | Bullock | Sept. 2, 1919 |
| 2,626,294 | Brennan | Jan. 20, 1953 |
| 2,658,099 | Basset | Nov. 3, 1953 |
| 2,737,541 | Coolidge | Mar. 6, 1956 |

FOREIGN PATENTS

| | | |
|---|---|---|
| 653,235 | Great Britain | May 9, 1951 |